Figure 2:
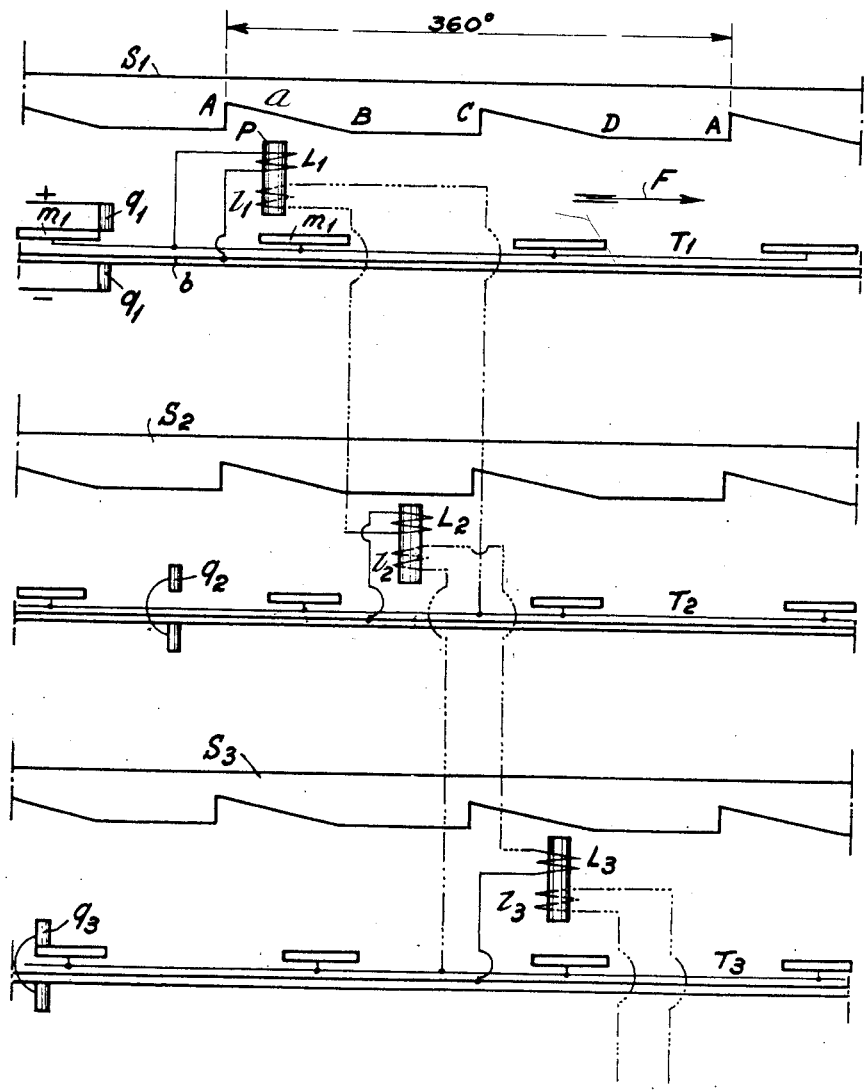

Feb. 16, 1954  M. DE TASTES  2,669,687
ELECTROMAGNETIC ATTRACTION MOTOR
Filed Nov. 9, 1951  2 Sheets-Sheet 1
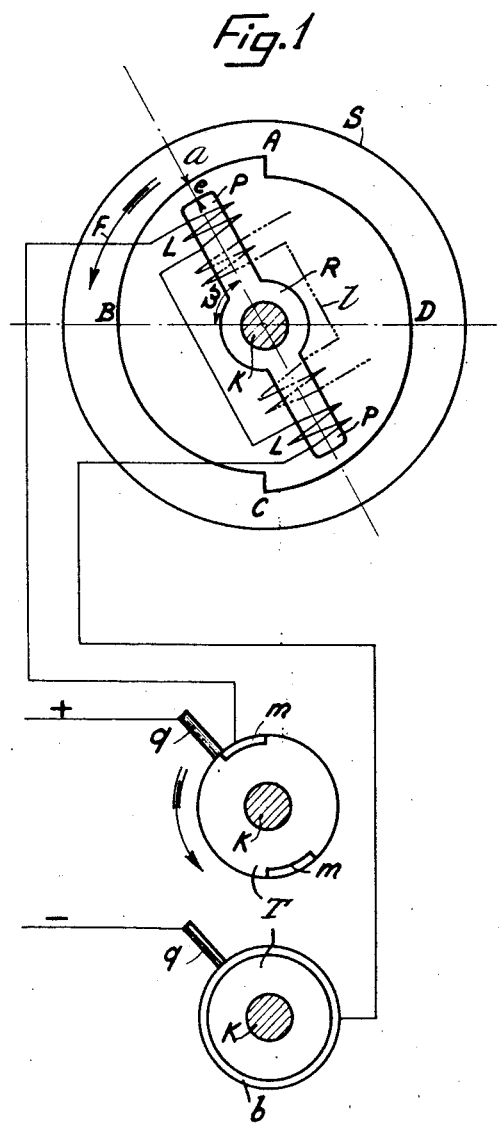
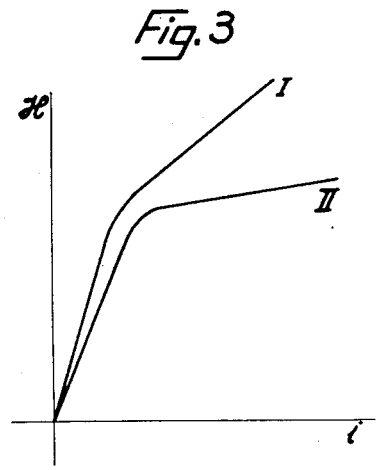
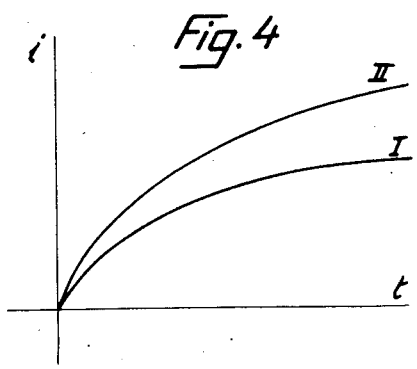
INVENTOR
Maurice de Tastes
By Watson, Cole, Grindle & Watson Patented Feb. 16, 1954

2,669,687

UNITED STATES PATENT OFFICE 2,669,687

ELECTROMAGNETIC ATTRACTION MOTOR

Maurice de Tastes, Paris, France

Application November 9, 1951, Serial No. 255,618

Claims priority, application France
November 14, 1950

5 Claims. (Cl. 318—492)

This invention relates to electromagnetic attraction motors.

Motors of this type include a rotor carrying a winding connected to a source of current through a make-and-break device, so that said winding is intermittently supplied with current, and a stator the inner surface of which is formed with cylindrical portions coaxial with the rotor and other generally cylindrical portions eccentered with respect to it (actually these latter portions are conveniently of spiral shape), so as to provide for an air-gap of variable width. The make-and-break device is so timed as to close the energizing circuit when the pole faces of the rotor are opposite an eccentered portion of the stator surface, and to break this circuit when these pole faces are opposite a coaxial stator portion.

These motors operate as follows:

When current flows through the winding accommodated on the rotor, as the pole faces of the latter are opposite an eccentered stator portion, the rotor will rotate in the direction of decreasing air-gap, owing to attraction effect. On reaching the zone of constant air-gap corresponding to a coaxial stator portion, current is cut out and the rotor goes on rotating owing to its inertia, or preferably due to the fact that, at this instant, another pole face of the rotor associated with a further winding reaches a zone of decreasing air-gap and is, in its turn, attracted.

With such motors, large commutator losses are incurred and intense sparking is produced by the surge or extra-current which is induced every time the current is cut out. As a result, these motors have a very poor efficiency (usually less than 50%) as compared with almost all the other kinds of electric motors, the efficiencies of which normally range above 90%. This is the reason why they are practically never used for driving purposes. However, they have some interest as regards laboratory and research works, in particular with reference to the investigation of various electrical phenomena such as the evolution of current in making and breaking a circuit, the determination of the time-constant of a circuit, etc.

The main object of the present invention is to provide an attraction motor of improved efficiency and in which practically no sparking is produced.

This object is mainly achieved by recovering the otherwise wasted energy of the surge or extra-current flowing through a winding just after it is switched off, for supplying current energy to a further winding or other circuit. In the following specification and the sub-joined claims, the former-mentioned winding will be called "primary winding" and the latter-mentioned winding will be called "secondary winding."

Other objects and advantages of the invention will be apparent during the course of the following description.

In the accompanying drawing in which like reference characters are employed to designate like parts throughout the same, Fig. 1 shows diagrammatically a two pole motor with its feed circuit, Fig. 2 is a developed diagrammatic view of a motor having a plurality of rotors.

Figs. 3 and 4 are graphs showing respectively the magnetisation and the current establishment curves, both in the case of a constant-width air-gap and of a variable-width air-gap.

The motor illustrated in Fig. 1 comprises a stator S constituted by a laminated core of silicon iron sheets and a rotor R keyed to a shaft K.

The inner surface of the stator S is formed of two diametrically opposite cylindrical segments AD and BC coaxial with the rotor and connected to one another by two spiral segments AB and CD (the latter may be cylindrical segments eccentric with respect to AD and BC). Therefore when a pole face P of the rotor moves from A to B or from C to D, the air-gap e decreases proportionally to the angle at the centre ω; on the other hand, when the pole face P moves from B to C or from D to A, the air-gap remains constant.

The rotor R carries two windings: a primary winding L (shown in full line) and a secondary winding $l$ (shown in dot-and-dash line). The primary winding L is connected to a rotary commutator T fast with the shaft K and composed of a continuous conducting ring $b$ and an insulating ring bearing two contact studs $m$—$m$. This commutator is connected, through brushes $q$—$q$, to a source of direct current.

The secondary winding $l$ is connected to an appropriate circuit including power absorbing means. In the example of Fig. 2 in which the motor comprises several systems similar to that of Fig. 1, the secondary winding $l_1$ of the first system is connected to the main winding $L_2$ of the second system, through a rotary commutator $T_2$; similarly the secondary winding $l_2$ of the second system is connected to the main winding $L_3$ of the third system, through a commutator $T_3$, and so on.

The various rotors as well as their commutators are fast in rotation; they are, for instance, keyed on a same shaft K. As shown in Fig. 2, the relative positions of the rotors of the successive systems, with respect to their stators $S_1$, $S_2$, $S_3$ ..., are shifted through a little more than 90°. A same shift is given to the brushes $q_1$, $p_2$, $q_3$. ...

The brushes $q_1$ of the first rotor are connected to the source of direct current, whereas the brushes $q_2$, $q_3$ ... of the following rotors are short-circuited.

If the main winding L is excited when the pole P is in the zone of variable-width air-gaps, i. e. between A and B (or between C and D), the rotor will rotate in the direction of the arrow F which is that of decreasing air-gaps owing to the attraction effect exerted on the pole P. This attraction effect will remain until the pole P reaches the point B (or D) which lies at the origin of the zone of constant-width air-gaps BC (or DA).

It is therefore convenient to excite the winding L only during the displacement of the rotor in the zone of variable-width air-gaps. However, the circuit containing the winding L will not be closed when the pole P is opposite A, but slightly beyond that point, at $a$, in order to avoid disturbance due to the protrusion formed at the junction-point of the segments AB and AD. The current supplied to winding L will be cut off when the pole P will have reached the point B.

At this moment, in conventional motors, an extra-current spark is produced which causes an important loss in efficiency.

This spark is avoided in the motor according to the invention (see Fig. 2), owing to the fact that, a very short time before switching off the primary $L_1$ of the first rotor, the rotary commutator $T_2$ connects its secondary winding $l_1$ to the primary winding $L_2$ of the following rotor which lies, at this moment, in the zone of variable-width air-gaps opposite a point $a$. Thus, the extra current energy of the primary winding $L_1$ is collected, in the form of induced current, by the secondary winding $l_1$, this current being used for exciting the primary winding $L_2$, thereby ensuring attraction of the second rotor.

The same operation is repeated when the current in $L_2$ is, in its turn, cut off, the extra-current energy being transmitted by $l_2$ to $L_3$ through the commutator $T_3$, thus ensuring attraction of the third rotor, and so on, until the losses due to hysteresis, eddy currents and Joule's effect, will have so reduced the extra-current energy that it becomes unusable.

It is obvious that a rotor will be attracted as long as current flows through the corresponding winding, provided the pole face of the rotor does not leave the zone of variable width air-gaps. A highly satisfactory operation of the motor is achieved by so adjusting the time-constant of each circuit that the time of establishment of current in this circuit, i. e., the time taken by the current to grow to its maximum value, is equal or slightly greater than the time taken by the corresponding rotor for rotating from $a$ to B. Thus, on the one hand, the winding is energized during the whole attraction cycle and, on the other hand, the current is cut off before reaching its maximum value.

The time-constant of the circuits depends on the R. P. M. of the rotor, the air-gap and the self-induction of the windings. As shown in the magnetisation curves of Fig. 3, the magnetising force $\mathcal{H}$ increases more rapidly in the case of a decreasing air-gap (curve I) than in the case of a constant air-gap (curve II). Consequently, for a same exciting current $i$, the flux will be greater in a decreasing air-gap system than in a constant air-gap system. The time of establishment of the current is, as a result, greater in the former case (curve I, Fig. 4) than in the latter case (curve II).

The motor which has been described above, is only given as an example, and other forms may be resorted to. In particular, instead of using a motor with a plurality of stators and two-pole rotors, it is possible to devise a motor with a single stator and a multi-pole rotor, the connections being effected as shown in Fig. 2.

What I claim is:

1. An electromagnetic attraction motor of the type described including a rotor having at least one pair of pole faces and a stator having surface portions so shaped as to provide successively for an air-gap of decreasing width and an air-gap of constant width, comprising a primary winding on said rotor, means for supplying current to said primary winding when said pole faces are in a zone of decreasing air-gap and for cutting off current when said pole faces are in a zone of constant air-gap, a secondary winding on said rotor electromagnetically coupled with said primary winding, a circuit electrically connected to said secondary winding, and switching means in said circuit for switching it on at latest when the supply current to the primary winding is cut off and for switching it off at latest when the supply current to the primary winding is set up.

2. A motor as claimed in claim 1, wherein the circuit connected to the secondary winding includes a further primary winding associated with a further pair of rotor pole faces so shifted with respect to the former-mentioned pole faces that when said former-mentioned pole faces reach a zone of constant air-gap, said further pole faces are in a zone of decreasing air-gap.

3. A motor as claimed in claim 1, wherein the means for supplying current to the primary winding include a source of current and a make-and-break device mechanically connected to the rotor, and the switching means are also mechanically connected to the rotor.

4. A motor as claimed in claim 1, wherein the current supply means are adjusted for cutting off the current at the instant the pole faces reach the zone of constant air-gap.

5. A motor as claimed in claim 1, wherein the switching means are adjusted for switching on the circuit a very short instant before the supply current to the primary winding is cut off.

MAURICE DE TASTES.

No references cited.